United States Patent
Ying et al.

(10) Patent No.: US 11,394,292 B2
(45) Date of Patent: Jul. 19, 2022

(54) POWER UNIT

(71) Applicant: Delta Electronics (Shanghai) CO., LTD, Shanghai (CN)

(72) Inventors: Jianping Ying, Shanghai (CN); Teng Liu, Shanghai (CN); Dehai Lou, Shanghai (CN); Xin Wang, Shanghai (CN); Yun Cao, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 32 days.

(21) Appl. No.: 16/830,346

(22) Filed: Mar. 26, 2020

(65) Prior Publication Data

US 2020/0313544 A1    Oct. 1, 2020

(30) Foreign Application Priority Data

Mar. 27, 2019    (CN) .......................... 201910238799.0

(51) Int. Cl.
*H02M 1/32*        (2007.01)
*H02M 3/00*        (2006.01)
*H02M 1/00*        (2006.01)

(52) U.S. Cl.
CPC .............. *H02M 1/32* (2013.01); *H02M 3/00* (2013.01); *H02M 1/0074* (2021.05)

(58) Field of Classification Search
CPC .... H02M 1/32; H02M 1/0074; H02M 3/1584; H02M 1/0077
See application file for complete search history.

(56) References Cited

U.S. PATENT DOCUMENTS

2005/0185430 A1    8/2005  Vinciarelli
2005/0270812 A1   12/2005  Vinciarelli
(Continued)

FOREIGN PATENT DOCUMENTS

CN         2468145 Y    12/2001
CN      102522896 A     6/2012
(Continued)

OTHER PUBLICATIONS

Machine translation of second office action for Chineese Application No. 201910238799.0 (Year: 2021).*
(Continued)

*Primary Examiner* — Peter M Novak
(74) *Attorney, Agent, or Firm* — Qinghong Xu

(57) ABSTRACT

A power unit includes: a DC/DC conversion circuit; a bypass circuit, including a mechanical switch, an impedance network, and a semiconductor switch, wherein the semiconductor switch and the impedance network are connected in series to form a series branch, the series branch, the mechanic switch and the DC/DC conversion circuit are connected in parallel between a positive end and a negative end at one side of the power unit; a detecting unit, configured to detect a working signal of the DC/DC conversion circuit and generate a detection signal according to the working signal; and a controller, configured to, when the fault occurs in the DC/DC conversion circuit, output a first control signal to a control end of the mechanical switch and output a second control signal to a control end of the semiconductor switch.

14 Claims, 7 Drawing Sheets

(56) References Cited

U.S. PATENT DOCUMENTS

| | | | |
|---|---|---|---|
| 2009/0295228 A1* | 12/2009 | Ochi | H02M 3/156 307/66 |
| 2012/0175962 A1 | 7/2012 | Zhan et al. | |
| 2015/0326008 A1* | 11/2015 | Baurle | H02H 1/0007 361/87 |
| 2016/0261205 A1 | 9/2016 | Kolar et al. | |
| 2017/0141692 A1* | 5/2017 | Stewart | H02M 5/293 |
| 2018/0175724 A1 | 6/2018 | Liu et al. | |
| 2018/0212535 A1 | 7/2018 | Xia et al. | |
| 2020/0091831 A1 | 3/2020 | Kadota et al. | |
| 2020/0313544 A1 | 10/2020 | Ying et al. | |
| 2021/0028641 A1 | 1/2021 | Ilic et al. | |
| 2021/0135455 A1 | 5/2021 | Marinopoulos et al. | |

FOREIGN PATENT DOCUMENTS

| | | | |
|---|---|---|---|
| CN | 104052292 A | * | 9/2014 |
| CN | 104052292 A | | 9/2014 |
| CN | 203967989 U | | 11/2014 |
| CN | 104466907 A | | 3/2015 |
| CN | 204741270 U | | 11/2015 |
| CN | 103746553 B | | 2/2016 |
| CN | 205017003 U | | 2/2016 |
| CN | 103633623 B | * | 9/2016 |
| CN | 205620728 U | | 10/2016 |
| CN | 106099881 A | | 11/2016 |
| CN | 107040153 A | | 8/2017 |
| CN | 107124096 A | | 9/2017 |
| CN | 107332443 A | | 11/2017 |
| CN | 107529683 A | | 1/2018 |
| CN | 207010253 U | | 2/2018 |
| CN | 108322056 A | * | 7/2018 |
| CN | 108322056 A | | 7/2018 |
| CN | 108347180 A | | 7/2018 |

OTHER PUBLICATIONS

Machine translation of second office action for Chineese Application No. 201910239680.5 (Year: 2021).*
Machine translation of first office action for Chineese Application No. 201910238799.0 (Year: 2021).*
The 1st Office Action dated Apr. 6, 2021 from CN patent application No. 2019102387990.
The 1st Office Action dated Apr. 1, 2021 from CN patent application No. 2019102396805.
DC Solid State Transformer Based on Multilevel DC Link for Medium-voltage DC Distribution Application.
A modular DC-DC converter with collapsible input voltage of series connected modules without additional bypass switch.
Digital control of IGBTs for module shutdown in input-series and output-parallel connected modular DC-DC converter.
Research on the Key Technologies of Direct Current Transformer Based on Multiple Submodules.
The Non-final OA dated Jun. 1, 2021 for U.S. Appl. No. 16/830,327.
The 2nd Office Action dated Sep. 24, 2021 for CN patent application No. 201910239680.5.
The 2nd Office Action dated Oct. 22, 2021 for CN patent application No. 201910238799.0.
Dong Xiao, Power Electronic Technology, published in 2017, p. 211.
Anlian Qu, Electronic Circuit Analysis and Design, published in 2010, p. 140-142.

* cited by examiner

POWER UNIT

CROSS REFERENCE

The present application claims priority to Chinese Patent Application No. 201910238799.0, filed on Mar. 27, 2019, the entire contents of which are hereby incorporated by reference.

TECHNICAL FIELD

The disclosure relates to the field of power electronic conversion, and in particular, to a high voltage direct current (HVDC) power unit.

BACKGROUND

In HVDC converters, multiple DC-DC converters are connected in series in order to reach the high voltages required by HVDC lines. As shown in FIG. 1, when a certain DC/DC module in the system fails, it will directly affect the normal operation of the entire system. Therefore, the faulty DC/DC module needs to be bypassed in time to ensure that the system is not affected by the faulty DC/DC module and can continue to run stably.

The above information disclosed in the background section is used to enhance the understanding of the background of the present disclosure.

SUMMARY

According to a first aspect of the disclosure, there is provided a power unit.

The power unit includes a DC/DC conversion circuit.

The power unit further includes a bypass circuit, including a mechanical switch, an impedance network, and a semiconductor switch, wherein the semiconductor switch and the impedance network are connected in series to form a series branch, a first end of the series branch, a first end of the mechanical switch and a positive end at one side of the DC/DC conversion circuit are electrically connected to a positive end at one side of the power unit, and a second end of the mechanical switch, a second end of the series branch and a negative end at the one side of the DC/DC conversion circuit are electrically connected to a negative end at the one side of the power unit.

The power unit further includes a detecting unit, configured to detect a working signal of the DC/DC conversion circuit and generate a detection signal according to the working signal.

The power unit further includes a controller, configured to receive the detection signal and determine whether a fault occurs in the DC/DC conversion circuit according to the detection signal, and when the fault occurs in the DC/DC conversion circuit, the controller outputs a first control signal to a control end of the mechanical switch and outputs a second control signal to a control end of the semiconductor switch, so as to turn on the semiconductor switch prior to turning on the mechanical switch.

According to a second aspect of the disclosure, there is provided a power unit.

The power unit includes a plurality of power converters, one sides of the plurality of power converters being connected in series to form one side of the power unit, wherein each power converter includes a DC/DC conversion circuit and a bypass circuit, and the bypass circuit includes a mechanical switch, an impedance network, and a semiconductor switch, wherein the semiconductor switch and the impedance network are connected in series to form a series branch, a first end of the series branch, a first end of the mechanical switch and a positive end at one side of the DC/DC conversion circuit are electrically connected to a positive end at one side of a corresponding power converter; and a second end of the mechanical switch, a second end of the series branch and a negative end at the one side of the DC/DC conversion circuit are electrically connected to a negative end at the one side of the corresponding power converter.

The power unit further includes a detecting unit, configured to detect a working signal of a plurality of the DC/DC conversion circuits and generate a corresponding detection signal according to the working signal.

The power unit further includes a controller, configured to receive the detection signal and determine whether a fault occurs in one or more DC/DC conversion circuits of the power converters according to the detection signal, and when the fault occurs in the one or more DC/DC conversion circuits, the controller outputs a first control signal to a control end of the mechanical switch of a corresponding power converter and outputs a second control signal to a control end of the semiconductor switch of the corresponding power converter, so as to turn on the semiconductor switch prior to turning on the mechanical switch.

It should be understood that the above general description and the following detailed description are merely exemplary and explanatory, and should not limit the disclosure.

BRIEF DESCRIPTION OF THE DRAWINGS

The above and other objects, features, and advantages of the present disclosure will become more apparent by describing its exemplary embodiments in detail with reference to the accompanying drawings.

DETAILED DESCRIPTION

Figure 1:
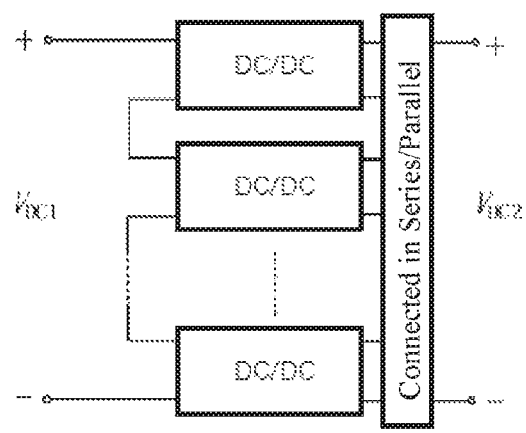
FIG. 1 illustrates a schematic diagram of a DC/DC conversion system having a series structure.

Exemplary embodiments will be described more comprehensively by referring to accompanying drawings now. However, the exemplary embodiments can be embodied in many forms and should not be construed as limited to the embodiments set forth herein; rather, these embodiments are provided so that this disclosure will be made thorough and complete, and the concept of exemplary embodiments will be fully conveyed to those skilled in the art. The drawings are merely schematic illustrations of the present disclosure and are not necessarily drawn to scale.

In addition, as used herein, "coupled" may mean that two or more elements are in directly physical or electrical contact with each other, or in indirectly physical or electrical contact with each other, or that two or more elements are in mutual operation or action.

Furthermore, the described features, structures, or characteristics may be combined in any suitable manner in one or more embodiments. In the following description, numerous exemplary details are provided to provide a thorough understanding of the embodiments of the disclosure. Those skilled in the art will recognize, however, that the technical solution of the disclosure may be practiced without one or more of the exemplary details described, or that other methods, components, materials, etc. may be employed. In other instances, well-known technical solutions are not shown or described in detail to avoid obscuring aspects of the disclosure.

Some block diagrams shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

The conventional technology of bypassing a faulty DC/DC module has the following problems.

1) Because the bus voltage $V_{DC1}$ of the power electronic conversion system is constant, a bypassed faulty DC/DC module may inevitably cause change of the voltage on the series side of each DC/DC module. However, there is a DC bus capacitor in each DC/DC module. The bypassed faulty DC/DC module may inevitably produce a large current impact in the series branch, which may cause overcurrent damage to related components.

2) After a DC/DC module fails, it needs to be bypassed quickly, otherwise the fault of the single DC/DC module may affect the stability of the entire system;

3) When a semiconductor device is used for achieving a fast action of the bypass, it may bring a new problem. Generally, after the faulty DC/DC module is bypassed, the system may continue to run. If the system is restarted after power failure, the semiconductor device may not work due to power loss of the control circuit, so the faulty DC/DC module cannot be bypassed in advance during the restart, which affects reliability of the system.

Therefore, a new bypass circuit needs to be designed.

The disclosure is directed to provide a power unit, including: a DC/DC conversion circuit; a bypass circuit, including a mechanical switch, an impedance network, and a semiconductor switch, wherein the semiconductor switch and the impedance network are connected in series to form a series branch, a first end of the series branch, a first end of the mechanical switch and a positive end at one side of the DC/DC conversion circuit are electrically connected to a positive end at one side of the power unit, and a second end of the mechanical switch, a second end of the series branch and a negative end at the one side of the DC/DC conversion circuit are electrically connected to a negative end at the one side of the power unit; a detecting unit, configured to detect a working signal of the DC/DC conversion circuit and generate a detection signal according to the working signal; and a controller, configured to receive the detection signal and determine, according to the detection signal, whether a fault occurs in the DC/DC conversion circuit and, when the fault occurs in the DC/DC conversion circuit, output a first control signal to a control end of the mechanical switch and output a second control signal to a control end of the semiconductor switch, so as to turn on the semiconductor switch prior to turning on the mechanical switch. The bypass circuit topology of the power unit of the present disclosure effectively suppresses a current surge generated during bypassing through the impedance network. In addition, when the topology of the bypass circuit is applied to the DC/DC conversion scenario, the semiconductor switch is used for achieving the fast bypass operation and, at the same time, the bypass of the faulty power unit can be maintained even if the auxiliary power supply is power off. After the bypass, the current may be switched to the mechanical switch branch, and the bypass circuit loss is small. Furthermore, by adding a diode, the current impact generated in the DC/DC conversion circuit during the bypass process can be smaller.

Figure 2:
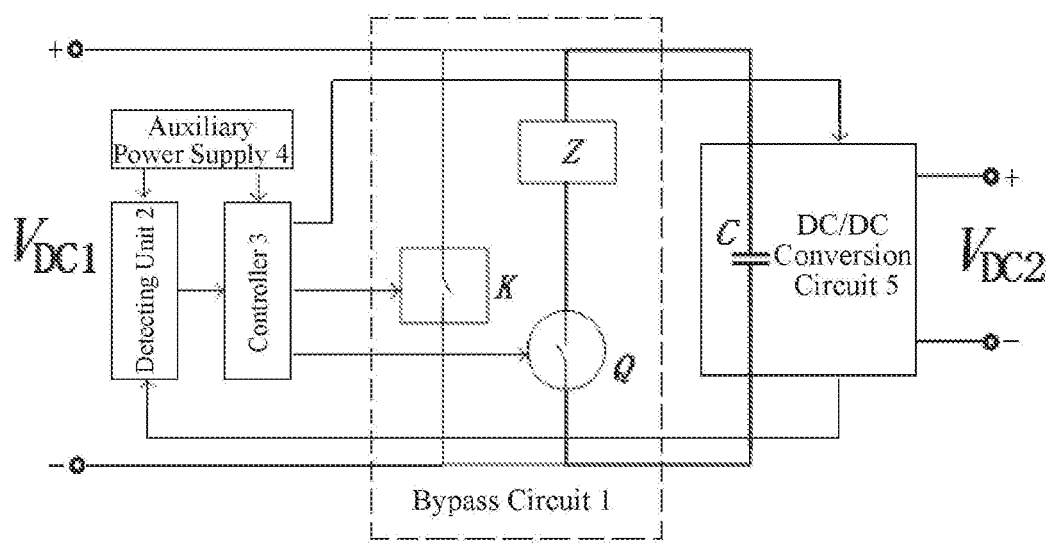
FIG. 2 illustrates a schematic diagram of a power unit according to an exemplary embodiment of the present disclosure.

FIG. 2 illustrates a schematic diagram of a power unit according to an exemplary embodiment of the present disclosure. As shown in FIG. 2, the power unit includes: a DC/DC conversion circuit 5; a bypass circuit 1, including a mechanical switch K, an impedance network Z, and a semiconductor switch Q, wherein the semiconductor switch Q and the impedance network Z are connected in series to form a series branch, a first end of the series branch, a first end of the mechanical switch K and a positive end at one side of the DC/DC conversion circuit 5 are electrically connected to a positive end at one side of the power unit, and a second end of the mechanical switch K, a second end of the series branch and a negative end at the one side of the DC/DC conversion circuit 5 are electrically connected to a negative end at the one side of the power unit; a detecting unit 2, which is configured to detect a working signal of the DC/DC conversion circuit 5 and generate a detection signal according to the working signal; and a controller 3, which is configured to receive the detection signal and determine, according to the detection signal, whether a fault occurs in the DC/DC conversion circuit 5 and, when the fault occurs in the DC/DC conversion circuit 5, output a first control signal to a control end of the mechanical switch K and output a second control signal to a control end of the semiconductor switch Q, so as to turn on the semiconductor switch Q prior to turning on the mechanical switch K. The types of faults of the DC/DC conversion circuit 5 include an over-voltage fault, an under-voltage fault, an over-current fault, or an over-temperature fault. The voltage at one side of the power unit may be expressed as $V_{DC1}$, and the voltage at the other side may be expressed as $V_{DC2}$. The one side of the power unit may be the input side, and the other side may be the output side, but it is not limited to this.

According to an exemplary embodiment of the disclosure, the power unit further includes an auxiliary power supply 4 configured to supply power for the detecting unit and the controller.

According to an exemplary embodiment of the disclosure, the DC/DC conversion circuit includes a DC bus capacitor C, wherein a first end of the DC bus capacitor C is electrically connected to the positive end at the one side of the DC/DC conversion circuit 5, and a second end of the DC bus capacitor C is electrically connected to the negative end at the one side of the DC/DC conversion circuit 5.

Figure 3:
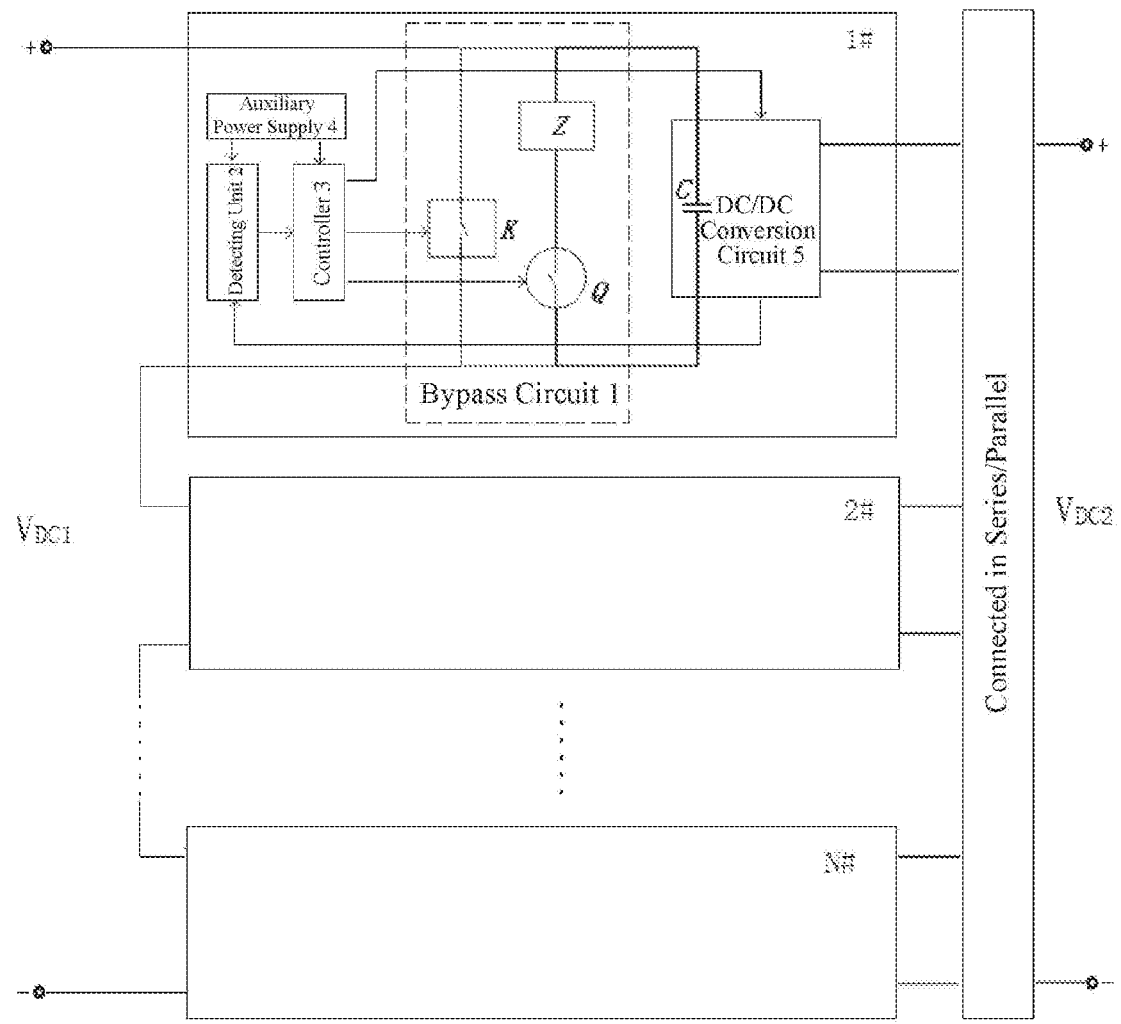
FIG. 3 illustrates a schematic diagram of a DC/DC conversion system including a power unit according to an exemplary embodiment of the present disclosure.

Specifically, FIG. 3 illustrates a schematic diagram of a DC/DC conversion system including a power unit according to an exemplary embodiment of the present disclosure. The system is a DC/DC conversion system with a series structure and includes a total of N (N≥1) power units (1#, 2# . . . N #). In the DC/DC conversion system with the series structure as shown in FIG. 3, the detecting unit 2 in each power unit may sample, through, for example, a sampling circuit, input voltage, output voltage, input current, output current, temperature, and any other form of working signal of the DC/DC conversion circuit 5, and generates a detection signal based on the detected working signal. The controller 3 may be various hardware, software, firmware, and combinations thereof, for example, DSP, FPGA, analog control chip, and the like. The controller 3 determines whether a fault occurs in the DC/DC conversion circuit 5 according to the received detection signal. When a fault, for example, over-voltage fault, under-voltage fault, over-current fault or over-temperature fault, occurs in the DC/DC conversion circuit 5, the controller 3 may send a first control signal to the control end of the mechanical switch K and output a second control signal to the control end of the semiconductor switch Q. The first control signal and the second control signal may be simultaneously sent to the semiconductor switch Q and the mechanical switch K, or may be sent to the semiconductor switch Q and the mechanical switch K in sequence (for example, the controller 3 may firstly output the second control signal and, after a first preset time delay, then output the first control signal; or, the controller 3 may also firstly output the first control signal and, after a second preset time delay, then output the second control signal, wherein a time period required for turning on the mechanical switch K is longer than the second preset time delay), as long as it is ensured that the semiconductor switch Q is quickly turned on first, and the mechanical switch K is turned on with a delay. After the semiconductor switch Q is turned on, the voltage between the positive and negative ends at one side of the DC/DC conversion circuit 5 changes abruptly. The DC bus capacitor C of the faulty DC/DC conversion circuit is discharged through the series branch of the bypass circuit, and other DC/DC conversion circuits charge the corresponding DC bus capacitor C through the series branch, such that the current impact generated by each DC/DC conversion circuit 5 is limited by the impedance network Z of the series branch. Subsequently, the mechanical switch K is turned on and kept in the conductive state, such that the bypass current of the faulty DC/DC converter circuit is commutated from the series branch to the mechanical switch K, thereby achieving the bypass of the faulty DC/DC converter circuit.

Based on the bypass circuit topology of the power unit as shown in FIG. 2, the current surge generated by the DC bus capacitor during bypassing can be effectively suppressed. In addition, when the topology of the bypass circuit is applied to the DC/DC conversion scenario, the semiconductor switch is used for achieving the fast bypass operation and, at the same time, the bypass of the faulty power unit can be maintained even if the auxiliary power supply is power off. After the bypass, the current may be switched to the mechanical switch K, and the bypass circuit loss is small.

Figure 4:
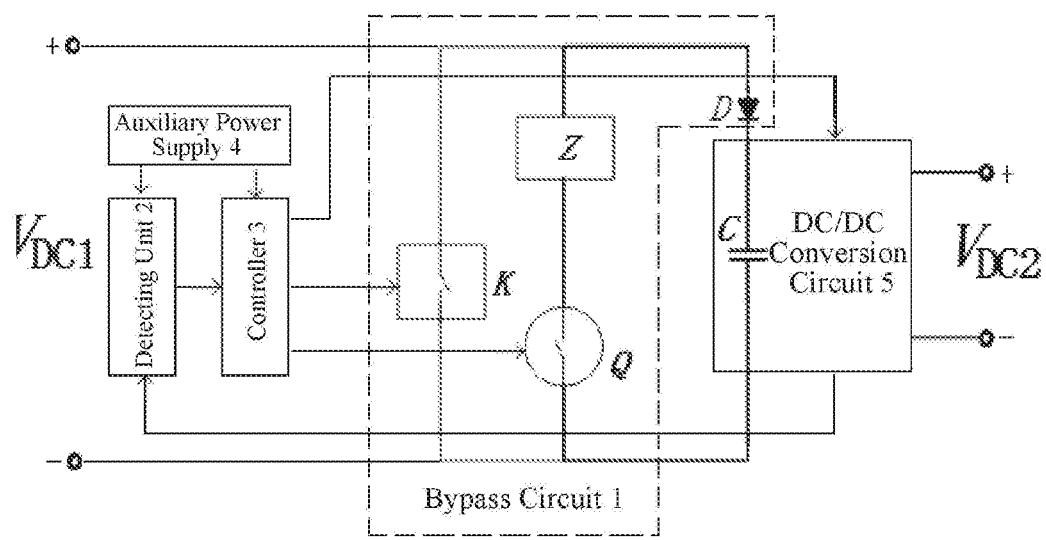
FIG. 4 illustrates a schematic diagram of a power unit with a diode according to an exemplary embodiment of the present disclosure.

According to an exemplary embodiment of the present disclosure as shown in FIG. 4, the bypass circuit 1 further includes a diode D, an anode of the diode D is connected to the first end of the series branch, and a cathode of the diode is connected to the first end of the DC bus capacitor C. The working process of the bypass circuit of the power unit shown in FIG. 4 is the same as that of the bypass circuit of the power unit shown in FIG. 2 (and the DC/DC conversion system including the power unit shown in FIG. 4 is similar to that shown in FIG. 3). After the semiconductor switch is turned on, the current at one side (the DC bus capacitor side) of the DC/DC converter circuit 5 flows through the series branch of the bypass circuit corresponding to the faulty DC/DC converter circuit. However, due to the presence of the diode D, the current impact generated by the faulty DC/DC conversion circuit (i.e., by the DC bus capacitor) is suppressed, while the current impact generated by other DC/DC conversion circuits (i.e., by their DC bus capacitors) is limited by the impedance network of the series branch. Subsequently, the mechanical switch K is turned on, such that the current at the one side (the DC bus capacitor side) of the DC/DC converter circuit is commutated to the mechanical switch K of the bypass circuit, and the loss of the bypass circuit is relatively small. Compared with the topology shown in FIG. 2, the present bypass circuit topology has a smaller current impact generated in the circuit during the bypass process.

Figure 5:
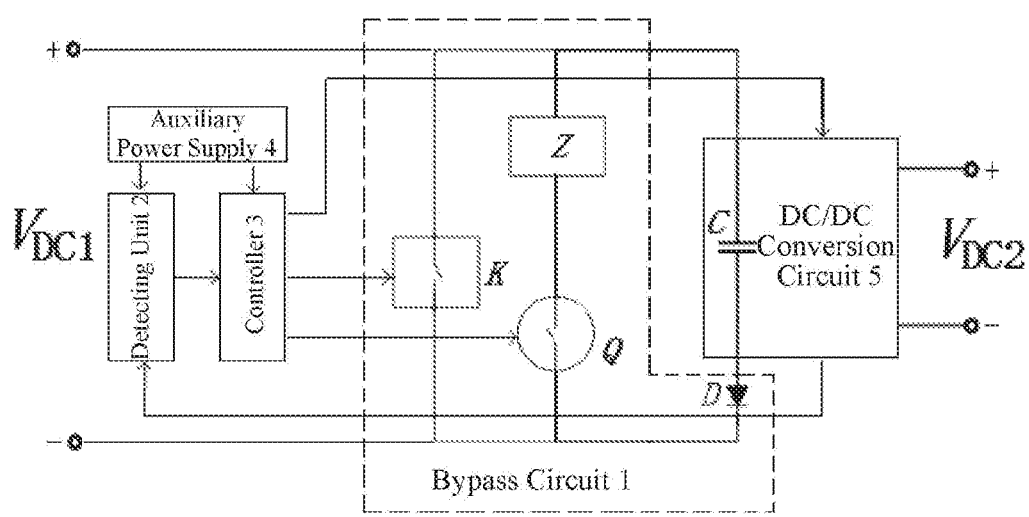
FIG. 5 illustrates a schematic diagram of a power unit with a diode according to another exemplary embodiment of the present disclosure.

According to an exemplary embodiment of the present disclosure as shown in FIG. 5, the bypass circuit 1 further includes a diode D, an anode of the diode D is connected to the second end of the DC bus capacitor C, and a cathode of the diode is connected to the second end of the series branch. The working process of the bypass circuit of the power unit shown in FIG. 5 is the same as that of the bypass circuit of the power unit shown in FIG. 2 (and the DC/DC conversion system including the power unit shown in FIG. 5 is similar to that shown in FIG. 3). After the semiconductor switch is turned on, the current at one side (the DC bus capacitor side) of the DC/DC converter circuit 5 flows through the series branch of the bypass circuit corresponding to the faulty DC/DC converter circuit. However, due to the presence of the diode D, the current impact generated by the faulty DC/DC conversion circuit (i.e., by the DC bus capacitor) is suppressed, while the current impact generated by other DC/DC conversion circuits (i.e., by their DC bus capacitors) is limited by the impedance network of the series branch. Subsequently, the mechanical switch K is turned on, such that the current at the one side (the DC bus capacitor side) of the DC/DC converter circuit is commutated to the mechanical switch K of the bypass circuit, and the loss of the bypass circuit is relatively small. Compared with the topology shown in FIG. 2, the present bypass circuit topology has a smaller current impact generated in the circuit during the bypass process.

To sum up, there is no particular limitation on the position of the diode, as long as it is able to make the current impact generated in the circuit smaller during the bypass process.

According to an exemplary embodiment of the disclosure, when the fault occurs in the DC/DC conversion circuit, the controller is further configured to output a shutdown control signal for controlling the faulty DC/DC conversion circuit 5 to stop working.

According to an exemplary embodiment of the disclosure, the mechanical switch K includes a single mechanical switch, or a plurality of series-connected or parallel-connected mechanical switches.

According to an exemplary embodiment of the disclosure, the impedance network Z includes a resistor, an inductor, a capacitor, or a series-parallel combined structure consisting of the resistor, the capacitor, and the inductor.

According to an exemplary embodiment of the disclosure, the semiconductor switch Q includes a single semiconductor switch, or a plurality of series-connected or parallel-connected semiconductor switches.

It is to be noted that the above-mentioned DC/DC conversion system shown in FIG. 3 is merely an exemplary embodiment to which the power unit of the present disclosure is applied. The system is used as an example here to describe in detail the exemplary working process of the bypass circuit in the power unit of the present disclosure.

The bypass circuit topology of the power unit according to the present disclosure is not limited to the above system, but is applicable to any DC/DC conversion system with a series structure. For example, the auxiliary power supply may be provided inside each power unit, or the multiple power units may share an auxiliary power supply. Similarly, the controller and the detecting unit may be provided inside each power converter, or the multiple power converters may share a controller or a detecting unit. An exemplary implementation in which one controller or detecting unit is shared by multiple power converters will be described below with reference to FIG. 6.

Figure 6:
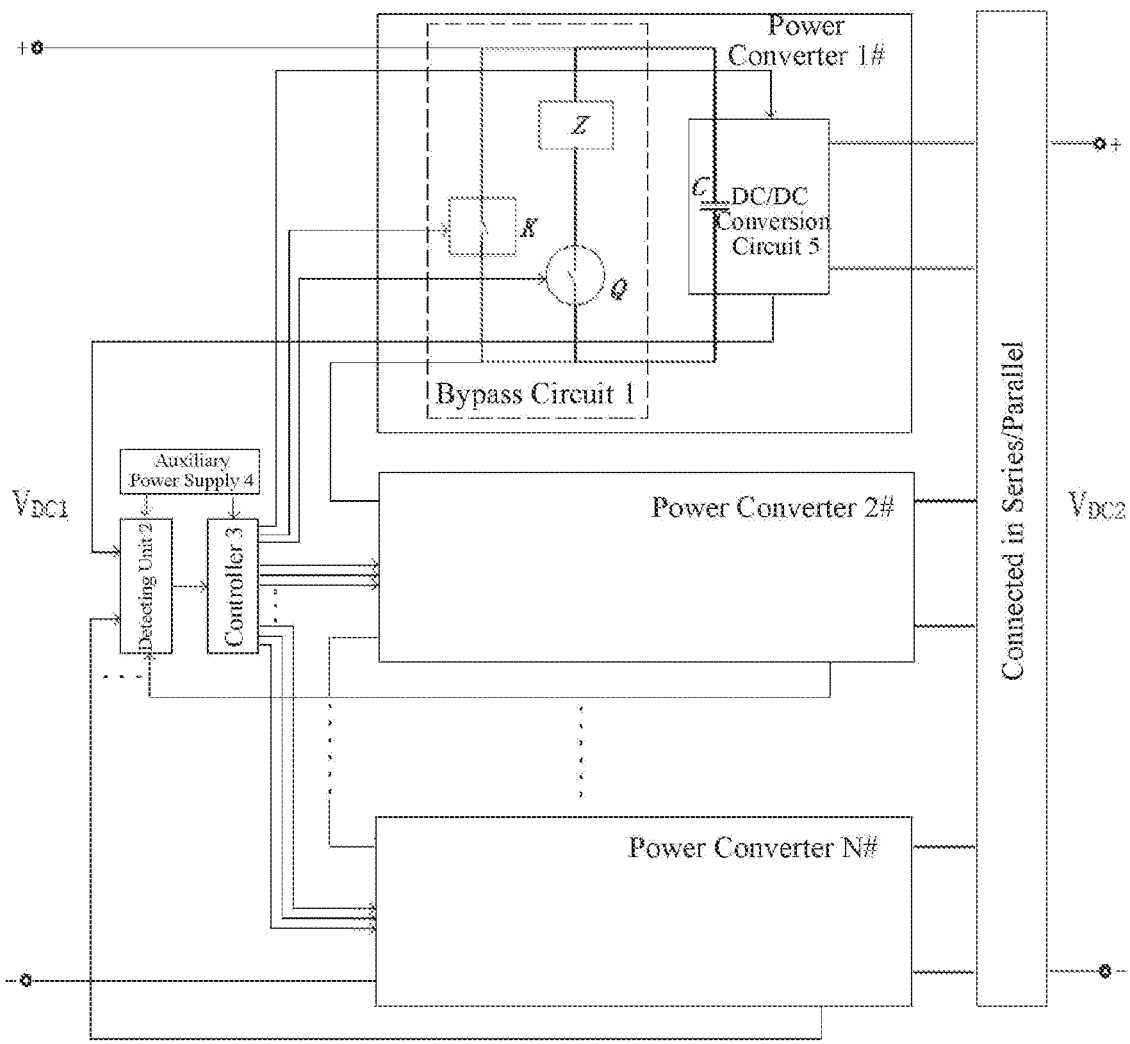
FIG. 6 illustrates a schematic diagram of a power unit according to another exemplary embodiment of the present disclosure.

FIG. 6 illustrates a schematic diagram of a power unit according to another exemplary embodiment of the present disclosure. As shown in FIG. 6, the power unit includes a number of power converters (e.g., the number is N (N≥1), including 1#, 2#, . . . , N #), one sides of the plurality of power converters being connected in series to form one side (e.g., the $V_{DC1}$ side) of the power unit, each power converter including a DC/DC conversion circuit 5 and a bypass circuit 1. The bypass circuit includes a mechanical switch K, an impedance network Z. and a semiconductor switch Q, the semiconductor switch Q and the impedance network Z are connected in series to form a series branch, a first end of the series branch, a first end of the mechanical switch K and a positive end at one side of the DC/DC conversion circuit 5 are electrically connected to a positive end at one side of a corresponding power converter, and a second end of the mechanical switch K, a second end of the series branch and a negative end at the one side of the DC/DC conversion circuit 5 are electrically connected to a negative end at the one side of the corresponding power converter; a detecting unit 2, configured to detect a working signal of a plurality of the DC/DC conversion circuits, generate a corresponding detection signal according to the working signal, and transmit the detection signal to a controller; and the controller 3, configured to receive the detection signal and determine, according to the detection signal, whether a fault occurs in one or more DC/DC conversion circuits of the power converters and, when the fault occurs in the one or more DC/DC conversion circuits, output a first control signal to a control end of the mechanical switch K of a corresponding power converter and output a second control signal to a control end of the semiconductor switch Q of the corresponding power converter, so as to turn on the semiconductor switch Q prior to turning on the mechanical switch K. The voltage at one side of the power unit may be expressed as $V_{DC1}$, and the voltage at the other side may be expressed as $V_{DC2}$.

Similar as the bypass circuit topology of the power unit as shown in FIG. 2, Based on the bypass circuit topology of the power unit as shown in FIG. 6, the current surge generated by the DC bus capacitor during bypassing can be effectively suppressed. In addition, when the topology of the bypass circuit is applied to the DC/DC conversion scenario, the semiconductor switch is used for achieving the fast bypass operation and, at the same time, the bypass of the faulty power unit can be maintained even if the auxiliary power supply is power off. After the bypass, the current may be switched to the mechanical switch K. and the bypass circuit loss is small.

According to an exemplary embodiment of the disclosure, the power unit further includes an auxiliary power supply 4 configured to supply power for the detecting unit 2 and the controller 3.

According to an exemplary embodiment of the disclosure, the DC/DC conversion circuit 5 includes a DC bus capacitor C, wherein a first end of the DC bus capacitor C is electrically connected to the positive end at the one side of the DC/DC conversion circuit 5, and a second end of the DC bus capacitor C is electrically connected to the negative end at the one side of the DC/DC conversion circuit 5.

Figure 7:
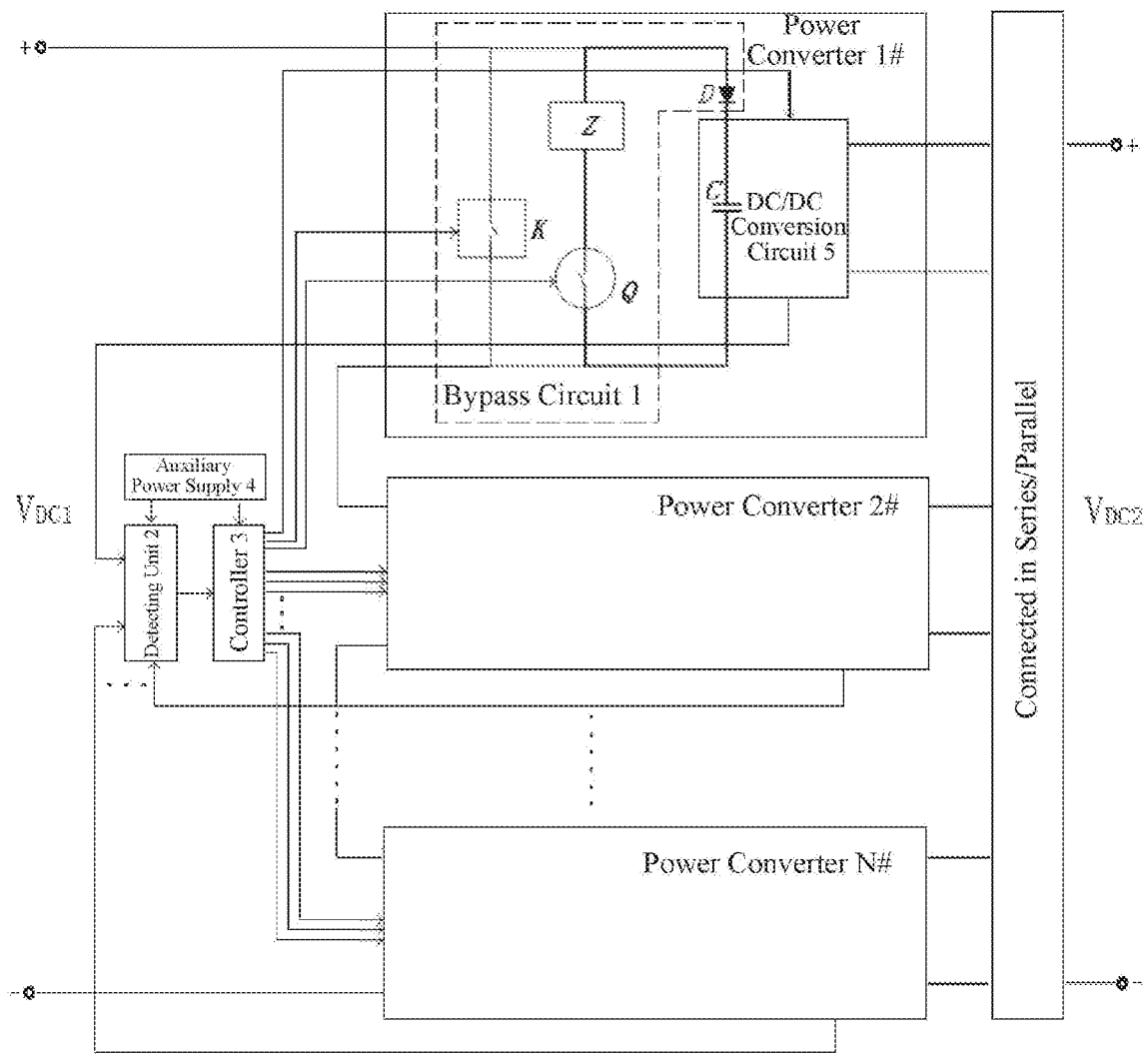
FIG. 7 illustrates a schematic diagram of a power unit with a diode according to another exemplary embodiment of the present disclosure.

According to an exemplary embodiment of the present disclosure as shown in FIG. 7, the DC/DC conversion circuit 5 includes a DC bus capacitor C. The bypass circuit further includes a diode D, an anode of the diode D is connected to the first end of the series branch, and a cathode of the diode D is connected to the first end of the DC bus capacitor C.

According to an exemplary embodiment of the present disclosure (not shown), the DC/DC conversion circuit 5 includes a DC bus capacitor C. The bypass circuit further includes a diode D, an anode of the diode D is connected to the second end of the DC bus capacitor C, and a cathode of the diode is connected to the second end of the series branch.

To sum up, there is no particular limitation on the position of the diode, as long as it is able to make the current impact generated in the circuit smaller during the bypass process.

According to an exemplary embodiment of the disclosure, the controller 3 simultaneously outputs the first control signal and the second control signal.

According to an exemplary embodiment of the disclosure, the controller 3 outputs the second control signal and, after a first preset time delay, then outputs the first control signal; or the controller 3 outputs the first control signal and, after a second preset time delay, then outputs the second control signal, wherein a time period required for turning on the mechanical switch K is longer than the second preset time delay.

According to an exemplary embodiment of the disclosure, when the fault occurs in one or more of the DC/DC conversion circuits, the controller 3 is further configured to output a shutdown control signal for controlling the faulty DC/DC conversion circuit to stop working.

According to an exemplary embodiment of the disclosure, the mechanical switch K includes a single mechanical switch, or a plurality of series-connected or parallel-connected mechanical switches.

According to an exemplary embodiment of the disclosure, the impedance network Z includes a resistor, an inductor, a capacitor, or a series-parallel combined structure consisting of the resistor, the capacitor, and the inductor.

According to an exemplary embodiment of the disclosure, the semiconductor switch Q includes a single semiconductor switch, or a plurality of series-connected or parallel-connected semiconductor switches.

From the foregoing detailed description, those skilled in the art can easily understand that a power unit according to an exemplary embodiment of the present invention has one or more of the following advantages.

According to some embodiments of the present disclosure, the bypass circuit topology of the power unit of the present disclosure effectively suppresses a current surge generated during bypassing through the impedance network. In addition, when the topology of the bypass circuit is applied to the DC/DC conversion scenario, the semiconductor switch is used for achieving the fast bypass operation and, at the same time, the bypass of the faulty power unit can be maintained even if the auxiliary power supply is power off. After the bypass, the current may be switched to the mechanical switch branch, and the bypass circuit loss is small.

Furthermore, according to some embodiments of the present disclosure, by adding a diode, the current impact generated in the DC/DC conversion circuit during the bypass process can be smaller.

Other embodiments of the disclosure will be apparent to those skilled in the art from consideration of the specification and practice of the invention disclosed here. This application is intended to cover any variations, uses, or adaptations of the disclosure following the general principles thereof and including such departures from the disclosure as come within known or customary practice in the art. It is intended that the specification and embodiments be considered as exemplary only, with a true scope and spirit of the disclosure being indicated by the claims.

It is to be noted that that the present disclosure is not limited to the precise structure that has been described above and shown in the drawings, and various modifications and changes can be made without departing from the scope thereof. The scope of the disclosure is only limited by the appended claims.

What is claimed is:

1. A power unit, comprising:
a plurality of power converters, one sides of the plurality of power converters being connected in series to form one side of the power unit,
wherein each power converter comprises a DC/DC conversion circuit and a bypass circuit, and the bypass circuit comprises a mechanical switch, an impedance network, and a semiconductor switch,
wherein the semiconductor switch and the impedance network are connected in series to form a series branch, a first end of the series branch, a first end of the mechanical switch and a positive end at one side of the DC/DC conversion circuit are electrically connected to a positive end at one side of a corresponding power converter; and a second end of the mechanical switch, a second end of the series branch and a negative end at the one side of the DC/DC conversion circuit are electrically connected to a negative end at the one side of the corresponding power converter;
a detecting unit, configured to detect a working signal of a plurality of the DC/DC conversion circuits and generate a corresponding detection signal according to the working signal; and
a controller, configured to receive the detection signal and determine whether a fault occurs in one or more DC/DC conversion circuits of the power converters according to the detection signal, and when the fault occurs in the one or more DC/DC conversion circuits, the controller outputs a first control signal to a control end of the mechanical switch of a corresponding power converter and outputs a second control signal to a control end of the semiconductor switch of the corresponding power converter, so as to turn on the semiconductor switch prior to turning on the mechanical switch; wherein the controller outputs the first control signal before outputting the second control signal, and a preset time delay exists between the first control signal and the second control signal, wherein a time period required for turning on the mechanical switch is longer than the preset time delay,
wherein the DC/DC conversion circuit comprises a DC bus capacitor, a first end of the DC bus capacitor is electrically connected to the first end of the series branch and the first end of the mechanical switch, and a second end of the DC bus capacitor is electrically connected to the second end of the mechanical switch and the second end of the series branch;
wherein after the semiconductor switch is turned on and before the mechanical switch is turned on, the DC bus capacitor is discharged through the series branch of the bypass circuit; and after the mechanical switch is turned on, bypass current of the DC/DC converter circuit is commutated from the series branch to the mechanical switch, thereby achieving bypass of the DC/DC converter circuit; and
wherein the bypass circuit further comprises a diode having two ends, one end of the diode is electronically connected to one of the positive end and the negative end at the one side of the corresponding power converter, and another end of the diode is connected, through the DC bus capacitor, to another one of the positive end and the negative end at the one side of the corresponding power converter.

2. The power unit according to claim 1, further comprising an auxiliary power supply configured to supply power for the detecting unit and the controller.

3. The power unit according to claim 1, wherein the two ends of the diode comprises an anode and a cathode,
the anode of the diode is connected to the first end of the series branch, and the cathode of the diode is connected to the first end of the DC bus capacitor; or
the anode of the diode is connected to the second end of the DC bus capacitor, and the cathode of the diode is connected to the second end of the series branch.

4. The power unit according to claim 1, wherein when the fault occurs in the one or more DC/DC conversion circuit, the controller is further configured to output a shutdown control signal, so as to controlling the faulty DC/DC conversion circuit to stop working.

5. The power unit according to claim 1, wherein the mechanical switch comprises a single mechanical switch, or a plurality of series-connected or parallel-connected mechanical switches.

6. The power unit according to claim 1, wherein the impedance network comprises a resistor, an inductor, a capacitor, or a series-parallel combined structure consisting of the resistor, the capacitor, and the inductor.

7. The power unit according to claim 1, wherein the semiconductor switch comprises a single semiconductor switch, or a plurality of series-connected or parallel-connected semiconductor switches.

8. A power unit, comprising:
a DC/DC conversion circuit;
a bypass circuit, comprising a mechanical switch, an impedance network, and a semiconductor switch, wherein the semiconductor switch and the impedance network are connected in series to form a series branch, a first end of the series branch, a first end of the mechanical switch and a positive end at one side of the DC/DC conversion circuit are electrically connected to a positive end at one side of the power unit, and a second end of the mechanical switch, a second end of the series branch and a negative end at the one side of the DC/DC conversion circuit are electrically connected to a negative end at the one side of the power unit;
a detecting unit, configured to detect a working signal of the DC/DC conversion circuit and generate a detection signal according to the working signal; and
a controller, configured to receive the detection signal and determine whether a fault occurs in the DC/DC conversion circuit according to the detection signal, and when the fault occurs, the controller outputs a first control signal to a control end of the mechanical switch and outputs a second control signal to a control end of the semiconductor switch, so as to turn on the semiconductor switch prior to turning on the mechanical switch; wherein the controller outputs the first control signal before outputting the second control signal, and a preset time delay exists between the first control signal and the second control signal, wherein a time period required for turning on the mechanical switch is longer than the preset time delay, wherein the DC/DC conversion circuit comprises a DC bus capacitor, a first end of the DC bus capacitor is electrically connected to the first end of the series branch and the first end of the mechanical switch, and a second end of the DC bus capacitor is electrically connected to the second end of the mechanical switch and the second end of the series branch;

wherein after the semiconductor switch is turned on and before the mechanical switch is turned on, the DC bus capacitor is discharged through the series branch of the bypass circuit; and after the mechanical switch is turned on, bypass current of the DC/DC converter circuit is commutated from the series branch to the mechanical switch, thereby achieving bypass of the DC/DC converter circuit; and wherein the bypass circuit further comprises a diode having two ends, one end of the diode is electronically connected to one of the positive end and the negative end at the one side of the corresponding power converter, and another end of the diode is connected, through the DC bus capacitor, to another one of the positive end and the negative end at the one side of the corresponding power converter.

9. The power unit according to claim 8, further comprising an auxiliary power supply configured to supply power for the detecting unit and the controller.

10. The power unit according to claim 8, wherein the two ends of the diode comprises an anode and a cathode,
the anode of the diode is connected to the first end of the series branch, and the cathode of the diode is connected to the first end of the DC bus capacitor; or
the anode of the diode is connected to the second end of the DC bus capacitor, and the cathode of the diode is connected to the second end of the series branch.

11. The power unit according to claim 8, wherein when the fault occurs in the DC/DC conversion circuit, the controller is further configured to output a shutdown control signal for controlling the faulty DC/DC conversion circuit to stop working.

12. The power unit according to claim 8, wherein the mechanical switch comprises a single mechanical switch, or a plurality of series-connected or parallel-connected mechanical switches.

13. The power unit according to claim 8, wherein the impedance network comprises a resistor, an inductor, a capacitor, or a series-parallel combined structure consisting of the resistor, the capacitor, and the inductor.

14. The power unit according to claim 8, wherein the semiconductor switch comprises a single semiconductor switch, or a plurality of series-connected or parallel-connected semiconductor switches.

* * * * *